(12) United States Patent
Weinstein et al.

(10) Patent No.: US 9,311,915 B2
(45) Date of Patent: Apr. 12, 2016

(54) CONTEXT-BASED SPEECH RECOGNITION

(71) Applicant: Google Inc., Mountain View, CA (US)

(72) Inventors: Eugene Weinstein, New York, NY (US); Pedro J. Mengibar, Jersey City, NJ (US); Johan Schalkwyk, Scarsdale, NY (US)

(73) Assignee: Google Inc., Mountain View, CA (US)

( * ) Notice: Subject to any disclaimer, the term of this patent is extended or adjusted under 35 U.S.C. 154(b) by 184 days.

(21) Appl. No.: 14/030,265

(22) Filed: Sep. 18, 2013

(65) Prior Publication Data

US 2015/0039299 A1 Feb. 5, 2015

Related U.S. Application Data

(60) Provisional application No. 61/860,443, filed on Jul. 31, 2013.

(51) Int. Cl.
*G10L 21/00* (2013.01)
*G10L 15/16* (2006.01)

(52) U.S. Cl.
CPC ...................................... *G10L 15/16* (2013.01)

(58) Field of Classification Search
USPC ......................................... 704/202, 246–252
See application file for complete search history.

(56) References Cited

U.S. PATENT DOCUMENTS

| | | | |
|---|---|---|---|
| 7,720,683 B1 * | 5/2010 | Vermeulen et al. ........... | 704/254 |
| 8,417,530 B1 | 4/2013 | Hayes | |
| 2002/0156626 A1 | 10/2002 | Hutchison | |
| 2004/0186714 A1 * | 9/2004 | Baker ............................ | 704/236 |
| 2010/0223056 A1 * | 9/2010 | Kadirkamanathan ......... | 704/235 |
| 2012/0016670 A1 | 1/2012 | Khorashadi | |
| 2012/0143863 A1 * | 6/2012 | Tran .............................. | 707/732 |
| 2014/0142929 A1 * | 5/2014 | Seide et al. ................... | 704/202 |
| 2014/0257804 A1 * | 9/2014 | Li et al. ......................... | 704/232 |
| 2014/0278379 A1 * | 9/2014 | Coccaro .............. | G10L 15/1815 |
| | | | 704/202 |
| 2014/0278426 A1 * | 9/2014 | Jost et al. ...................... | 704/257 |

FOREIGN PATENT DOCUMENTS

EP 0 574 951 12/1993

OTHER PUBLICATIONS

International Search Report and Written Opinion in International Application No. PCT/US2014/048123, mailed Nov. 3, 2014, 9 pages.
Abad, Alberto, "The L2F Language Recognition System for NIST LRE 2011", The 2011 NIST Language Recognition evaluation (LRE11) Workshop, Atlanta, US, Dec. 2011, 7 pages.
Bahar, Mohammad Hasan et al., "Accent Recognition Using I-Vector, Gaussian Mean Supervector and Gaussian Posterior Probability Supervector for Spontaneous Telephone Speech," 2013 IEEE International Conference on Acoustics, Speech, and Signal Processing (ICASSP), 5 pages.

(Continued)

*Primary Examiner* — Leonard Saint Cyr
(74) *Attorney, Agent, or Firm* — Fish & Richardson P.C.

(57) ABSTRACT

A processing system receives an audio signal encoding a portion of an utterance. The processing system receives context information associated with the utterance, wherein the context information is not derived from the audio signal or any other audio signal. The processing system provides, as input to a neural network, data corresponding to the audio signal and the context information, and generates a transcription for the utterance based on at least an output of the neural network.

20 Claims, 8 Drawing Sheets

(56) References Cited

OTHER PUBLICATIONS

Bahari, Mohammad Hasan et al., "Age Estimation from Telephone Speech using i-vectors", Interspeech 2012, 13th Annual Conference of the International Speech Communication Association, 4 pages.
Chang, Hung-an et al., "Recognizing English Queries on Mandarin Voice Search," 2011 IEEE International Conference on Acoustics, Speech and Signal Processing (ICASSP), 4 pages.
Chen, Tao et al., "Automatic Accent Identification Using Gaussian Mixture Models," 2001 IEEE Workshop on Automatic Speech Recognition and Understanding, 4 pages.
D'Haro, Luis Ferdinand et al., "Phonotactic Language Recognition using i-vectors and Phoneme Posteriogram Counts", Interspeech 2012, 13th Annual Conference of the International Speech Communication Association , 4 pages.
Dehak, Najim et al., "Front-End Factor Analysis for Speaker Verification", IEEE Transactions on Audio, Speech and Language Processing, vol. 19, issue 4, May 2011, 12 pages.
Dehak, Najim et al., "Language Recognition via Ivectors and Dimensionality Reduction", Interspeech 2011, 12th Annual Conference of the International Speech Communication Association, 4 pages.
Factor Analysis from Wikipedia, the free encyclopedia, downloaded from the internet on Jul. 15, 2013, http://en.wikipedia.org/w/index.php?title=Factor_analysis&oldid=559725962, 14 pages.
Hinton, Geoffrey et al., "Deep Neural Networks for Acoustic Modeling in Speech Recognition", IEEE Signal Processing Magazine, Nov. 2012, 16 pages.
I-Vectors from ALIZE wiki, downloaded from the internet on Jul. 15, 2013, http://mistral.univ-avignon.fr/mediawiki/index.php/I-Vectors, 2 pages.
Larcher, Anthony et al., "I-Vectors in the Context of Phonetically-Constrained Short Utterances for Speaker Verification", 2012 IEEE International Conference on Acoustics, Speech and Signal Processing (ICASSP), 4 pages.
Latent Variable from Wikipedia, the free encyclopedia, downloaded from the internet on Jul. 15, 2013, http://en.wikipedia.org/w/index.php?title=Latent_variable&oldid=555584475, 3 pages.
Lin, Hui et al., "Recognition of Multilingual Speech in Mobile Applications," 2012 IEEE International Conference on Acoustics, Speech and Signal Processing (ICASSP), 4 pages.
Martinez, David et al., "IVector-Based Prosodic System for Language Identification", 2012 IEEE International Conference on Acoustics, Speech and Signal Processing (ICASSP), 4 pages.
Martinez, David et al., "Language Recognition in iVectors Space", Interspeech 2011, 12th Annual Conference of the International Speech Communication Association , 4 pages.
Singer, Elliot et al., "The MITLL NIST LRE 2011 Language Recognition System", Odyssey 2012, The Speaker and Language Recognition Workshop, Jun. 25-28, 2012, Singapore, 7 pages.
Speech Recognition from Wikipedia, the free encyclopedia, downloaded from the internet on Jul. 15, 2013, http://en.wikipedia.org/w/index.php?title=Speech_recognition&oldid=555081415, 13 pages.

\* cited by examiner

CONTEXT-BASED SPEECH RECOGNITION

CROSS-REFERENCE TO RELATED APPLICATIONS

This application is claims priority to U.S. Provisional Application Ser. No. 61/860,443, filed on Jul. 31, 2013, which is incorporated herein by reference in its entirety.

FIELD

This specification describes technologies related to speech recognition.

BACKGROUND

Automatic speech recognition is an important technology that can be used in mobile devices and other devices. In general, automatic speech recognition attempts to provide accurate transcriptions of what a person has said. Automatic speech recognition systems may support multiple models for a variety of languages and dialects. However, relying on users to select a model from among these multiple models may sometimes result in users selecting an incorrect model, which can cause inaccurate speech recognition results.

SUMMARY

Rather than relying upon users to select a speech recognition model, speech recognition systems may use neural networks that incorporate multiple speech recognition models. These neural networks can indicate likelihoods that audio data corresponds to certain units of speech. Input to a neural network used for speech recognition can include information about the acoustic features of a portion of an utterance, as well as context information about the utterance. The context information may be information about the speaker of the utterance, the client device, and/or the circumstances in which the utterance was made, which was not derived from an audio signal encoding the utterance or another audio signal. For example, the context information may include an internet protocol (IP) address of the source, a geographic location of the source, a designated accent or language of the speaker, and/or a search history associated with the speaker. The input may also include time-independent audio characteristics derived from the utterance, such as information indicating characteristics of the speaker's voice or accent.

In other aspects, speech recognition systems may use statistical classifiers to select a speech recognition model. The statistical classifier may receive context information about the utterance as well as information derived from the utterance. The statistical classifier may then select a speech recognition model based on classifying the received information. Alternatively or in addition, a statistical classifier may rank the outputs of each of the speech recognition models in order of likelihood and combine their outputs into a single one. In other words, rather than selecting a single speech recognition model, a combination of speech recognizer hypotheses may be used.

In general, one aspect of the subject matter includes the actions of receiving an audio signal encoding a portion of an utterance and receiving context information associated with the utterance, wherein the context information is not derived from the audio signal or any other audio signal. The actions also include providing, as input to a neural network, data corresponding to the audio signal and the context information. The actions then include generating a transcription for the utterance based on at least an output of the neural network.

Some implementations involve providing, as an input to a neural network, a set of acoustic feature vectors derived from the audio signal and data corresponding to the context information.

The context information may be an internet protocol (IP) address of a client device from which the audio signal originated, a geographic location of a client device from which the audio signal originated, and/or a search history associated with a speaker of the utterance.

Some implementations involve the additional actions of receiving a set of data derived from the audio signal, the set of data corresponding to one or more time-independent characteristics of the audio signal. In such implementations, providing, as input to a neural network, data corresponding to the audio signal and the context information comprises providing, as input to a neural network, data corresponding to the audio signal, the context information, and the set of data derived from the audio signal. Optionally, in such implementations, the set of data corresponding to one or more time-independent characteristics of the audio signal includes one or more of a signal corresponding to an accent of a speaker of the utterance, a signal corresponding to background noise of the audio signal, a signal corresponding to recording channel properties of the audio signal, a signal corresponding to a pitch of the speaker, and a signal corresponding to an age of the speaker.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

When multiple speech recognizers are available in a speech recognition system, it may be desirable to assist the user in selecting an accurate speech recognizer for transcribing their speech. Indeed, leaving the process of selecting a speech recognizer to the user may sometimes result in selection of a less accurate speech recognizer for the user, thereby causing a poor user experience. To address this issue, some implementations of the present disclosure may involve providing context information, such as the location, internet protocol, and/or history of a user, to a neural network acoustic model in the speech recognizer. In addition, time-independent characteristics of the audio signal to be transcribed may be provided to the neural network. Alternatively or in addition, some implementations may involve providing context information, and optionally time-independent characteristics of the audio signal, to a statistical classifier that selects a speech recognition model on the basis of these inputs.

Figure 1A:
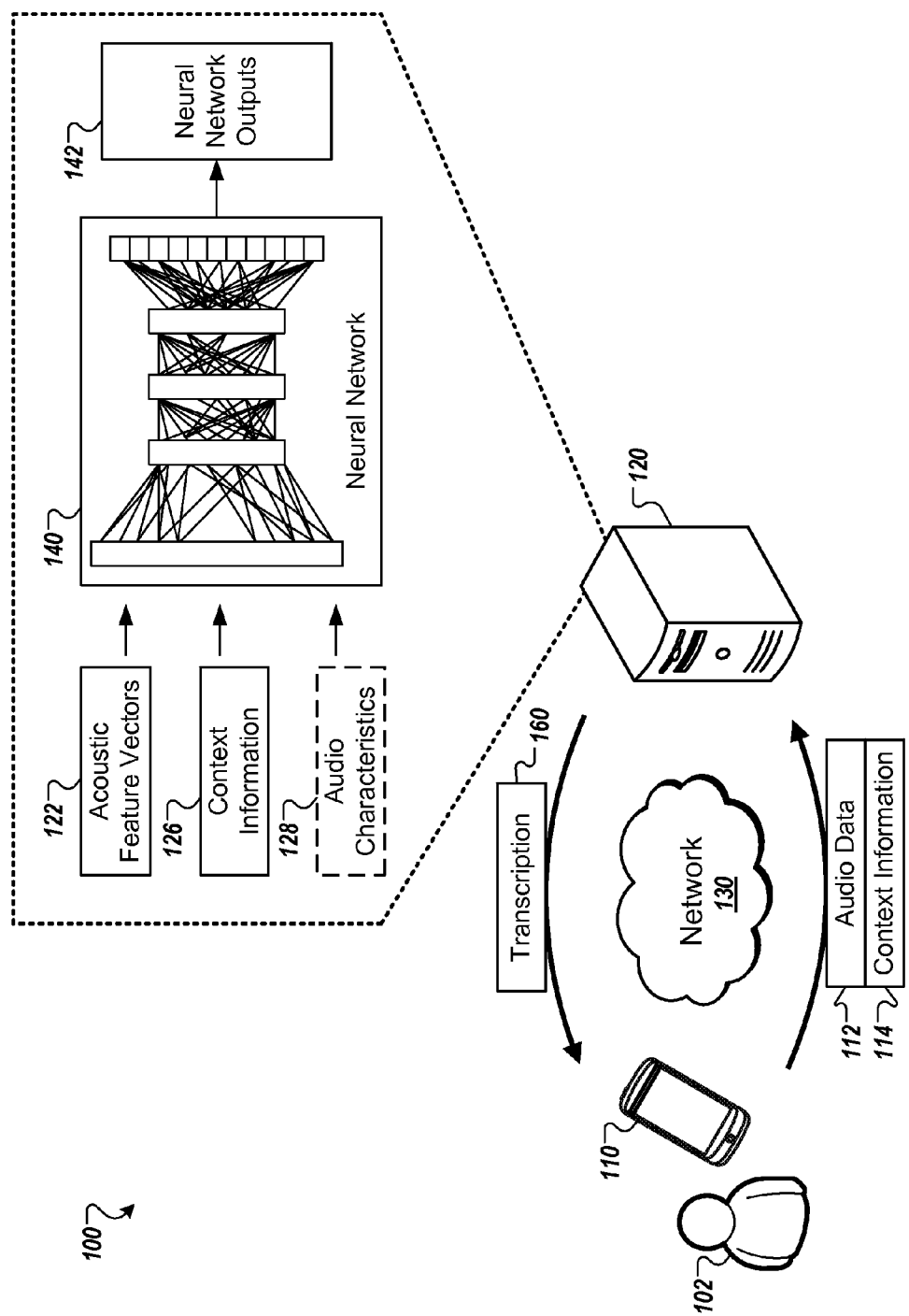
FIG. 1A is a block diagram that illustrates an example of a system for context-based speech recognition using neural networks.

FIG. 1A illustrates an example of a system 100 for speech recognition using neural networks. The system 100 includes a client device 110, a computing system 120, and a network 130. In the system 100, a user 102 speaks an utterance into the client device 110, which generates an audio signal 112 encoding the utterance. The client device 110 provides the audio signal 112 and context information 114 about the user 102 and/or the client device 110 to the computing system 120 via the network 130. The context information 114 may include the geographic location of the client device 110, an IP address from which the client device 110 originates the speech recognition request, and/or other information associated with the user 102 and/or the client device 110 such as an identifier. In some instances, the request may also include information identifying an accent of the user 102. The computing system 120 then processes the audio signal 112 and the context information 114, and provides an input to a neural network 140. The computing system 120 uses output 142 from the neural network 140 to identify a candidate transcription 160 for the utterance, which may then be transmitted back to the client device 110.

In the system 100, the client device 110 can be, for example, a desktop computer, laptop computer, a tablet computer, a wearable computer, a cellular phone, a smart phone, a music player, an e-book reader, a navigation system, or any other appropriate computing device. The functions performed by the computing system 120 can be performed by individual computer systems or can be distributed across multiple computer systems. The network 130 can be wired or wireless or a combination of both and can include the Internet.

In operation, a user 102 of the client device 110 initiates a speech recognition session such that the client device encodes an audio signal that includes speech of the user. The user may, for example, press a button on the client device 110 before speaking, speak an utterance, and then release the button on the client device 110. As another example, the client device 110 could be in a hands-free listening mode, i.e., the user would not have to initiate a voice input request in order for the speech recognizer to become active. In another example, the user may select a user interface control on the client device 110 before speaking the utterance. The client device 110 encodes the utterance into an audio signal 112, which may be, for example, a snippet of relatively high quality audio, such as 16 kHz lossless audio.

In addition, the client device 110 may obtain various context information 114 contemporaneously with (e.g., shortly before, during, or shortly after) the user's utterance. The context information 114 is information about the user 102, the client device 110, and/or the circumstances in which the utterance was made, which was not derived from the audio signal 112 or another audio signal. For example, when the user 102 initiates a speech recognition session, the client device 110 may obtain context information 114 in response to the initiation of the session. The context information 114 may include, for example, a geographic location, an IP address, accent data about the user 102, and/or a search history of the user 102. To obtain a geographic location, for example, the client device 110 may obtain a GPS location of the client device. Alternatively or in addition, the client device 110 may obtain location information using cellular network data and/or Wi-Fi signals. The client device 110 may also obtain (e.g., retrieve from memory) its current IP address. The client device may also obtain a phone number or an identifier of the client device 110 (e.g., an international mobile subscriber identity (MI)) and/or an identifier of the user 102 (e.g., a user account name or number).

In some implementations, the client device 110 may obtain accent data associated with the user 102. Alternatively or in addition, the computing system 120 may determine accent data as described below. The accent data may be a textual description of the accent of the utterance. The textual description may be encoded in an eXtensible Markup Language (XML) or JavaScript Object Notation (JSON) file. Alternatively, the accent data may be a bit field that includes bits that the computing system 120 can use to identify particular accents. The accent data may refer to an accent that is associated with a language that is different than the language of the utterance (e.g., a native Portuguese speaker speaking a query in English), or it may refer to an accent that is associated with the language of the utterance (e.g., U.S. English, British English, Australian English, or Indian English). A table accessible to the computing system 120 may cross-reference accents with languages or regions.

The client device 110 may obtain the accent associated with the user 102 by requesting that the user input accent data. Alternatively or in addition, if the user 102 opts to allow such a determination, the accent may be automatically determined by the client device 110 based on an analysis the user's usage history and/or speech. For instance, the accent data may be stored when the user specifies their native language or country of origin, or when an accent-identifying application running on the client device 110 or another device identifies the accent based on analyzing the user's speech or based on analyzing the resources that the user 102 has accessed in the past. Such applications may implement the automated accent-identifying processes described, for example, in K. Hirose et al., "Accent Type Recognition And Syntactic Boundary Detection Of Japanese Using Statistical Modeling Of Moraic Transitions Of Fundamental Frequency Contours," Proc. IEEE ICASSP'98 (1998), or T. Chen et al., "Automatic Accent Identification using Gaussian Mixture Models," IEEE Workshop on ASRU (2001).

In some implementations, the client device 110 may obtain a search history associated with the user 102. Alternatively or in addition, the computing system 120 may determine the user's search history as described with reference to FIG. 3B below. The user's search history may be based on an analysis of the user's search queries, clicks on search results, and/or resources accessed by the user. The search history may include data from the client device 110, from external search engines accessed by the user 102, or any combination of these.

The context information 114 may include various additional information about the user 102 and/or the client device 110. For example, the context information 114 may include an age, gender, or other demographic information of the user 102. In some cases, the context information 114 may include information about the make and/or model of the client device 110.

For privacy protection, any historical, behavioral or other data gathered can be obtained on an optional basis. Gathered data can be anonymized by various means. Search history data can be anonymized for privacy protection, so that the data, if compromised, cannot be associated with a particular user or user identifier. Various anonymization processes, such as hashing, encryption and obfuscation techniques, can be used to ensure that subject privacy is protected.

Upon encoding the audio signal and gathering the context information, the client device 110 transmits the audio signal and the context information 112 to the computing system 120 over the network 130. The transmitted audio signal 112 and the context information 114 may be combined in a single data structure and/or transmission. Alternatively, they may be separately transmitted. In such cases, the client device 110 may tag the audio signal and/or the context information with a reference or identifier so that the computing system 120 may associate the audio signal and the context information.

The computing system 120 receives the audio signal 112 and context information 114 and obtains information about acoustic features of the audio signal 112. For example, the computing system 120 may generate a set of feature vectors 122, where each feature vector 122 indicates audio characteristics during a different portion or window of the audio signal 112. Each feature vector 122 may indicate acoustic properties of, for example, a 10 millisecond (ms), 25 ms, or 50 ms portion of the audio signal 112. The computing system 120 also processes the received context information to obtain data 126 that is suitable for input into the neural network 140.

The computing system 120 also obtains audio characteristics 128 from the audio signal 112. These audio characteristics 128 may be independent of the words spoken by the user 102. For example, the audio characteristics 128 may indicate audio features that correspond to one or more of background noise, recording channel properties, the speaker's speaking style, the speaker's gender, the speaker's age, and/or the speaker's accent. While the feature vectors 122 may be indicative of audio characteristics of specific portions of the particular words spoken, the audio characteristics 128 may therefore be indicative of time-independent characteristics of the audio signal.

As discussed further below, the audio characteristics 128 can include latent variables of multivariate factor analysis (MFA) of the received audio signal 112 or of one or more other audio signals. The latent variables may be accessed from data storage, received from another system, or calculated by the computing system 120. To obtain the audio characteristics 128, the feature vectors 122, or other feature vectors derived from the audio signal 112, may be analyzed by a factor analysis model. The factor analysis model may create a probabilistic partition of an acoustic space using a Gaussian Mixture Model, and then average the feature vectors associated with each partition. The averaging can be a soft averaging weighted by the probability that each feature vector belongs to the partition. The result of processing with the factor analysis model can be an i-vector, as discussed further below.

A variety of different types of audio characteristics 128 may be used. In some implementations, the audio characteristics 128 are determined from the particular audio signal 112 that is being recognized. The audio characteristics 128 can include feature vectors that are produced with different processing from the processing used to generate the feature vectors 122. In some implementations, the audio characteristics 128 are determined from audio other than the particular audio signal 112 that is being recognized. For example, the audio characteristics 128 may indicate characteristics of other speech of the user 102, typical background noise at the location of the user 102, or speech of other users (e.g., users with the same age and gender). In some implementations, some or all of the audio characteristics 128 indicates characteristics of the speaker or the recording environment without indicating audio characteristics. As an example, the audio characteristics 128 may indicate an age or gender of the speaker.

In the illustrated example, the computing system 120 inputs the feature vectors 122, the data corresponding to the context information 126, and the audio characteristics 128 to the neural network 140. The neural network 140 has been trained to act as an acoustic model. For example, the neural network 140 indicates likelihoods that feature vectors correspond to different speech units when the feature vectors and certain types of additional information are provided. In some implementations, the neural network 140 may represent an acoustic model for a group of accents. For example, the neural network may represent a pan-English acoustic model that was trained with inputs from American English, British English, and Indian English speakers. Alternatively or in addition, the neural network 140 may represent an acoustic model for a group of languages. For example, the neural network may represent a Romance language acoustic model that was trained with inputs from French, Italian, Spanish, and Portuguese speakers.

The neural network 140 produces neural network outputs 142, which the computing system 120 uses to identify a transcription 160 for the audio signal 112. For example, the computing system 120 may provide the neural network outputs 142 to, for example, weighted finite state transducers that approximate a hidden Markov model (HMM), which may include information about a lexicon indicating the phonetic units of words, a grammar, and a language model that indicates likely sequences of words. The output of the HMM can be a word lattice from which the transcription 160 may be derived. The computing system 120 then provides the transcription 160 to the client device 110 over the network 130.

Figure 1B:
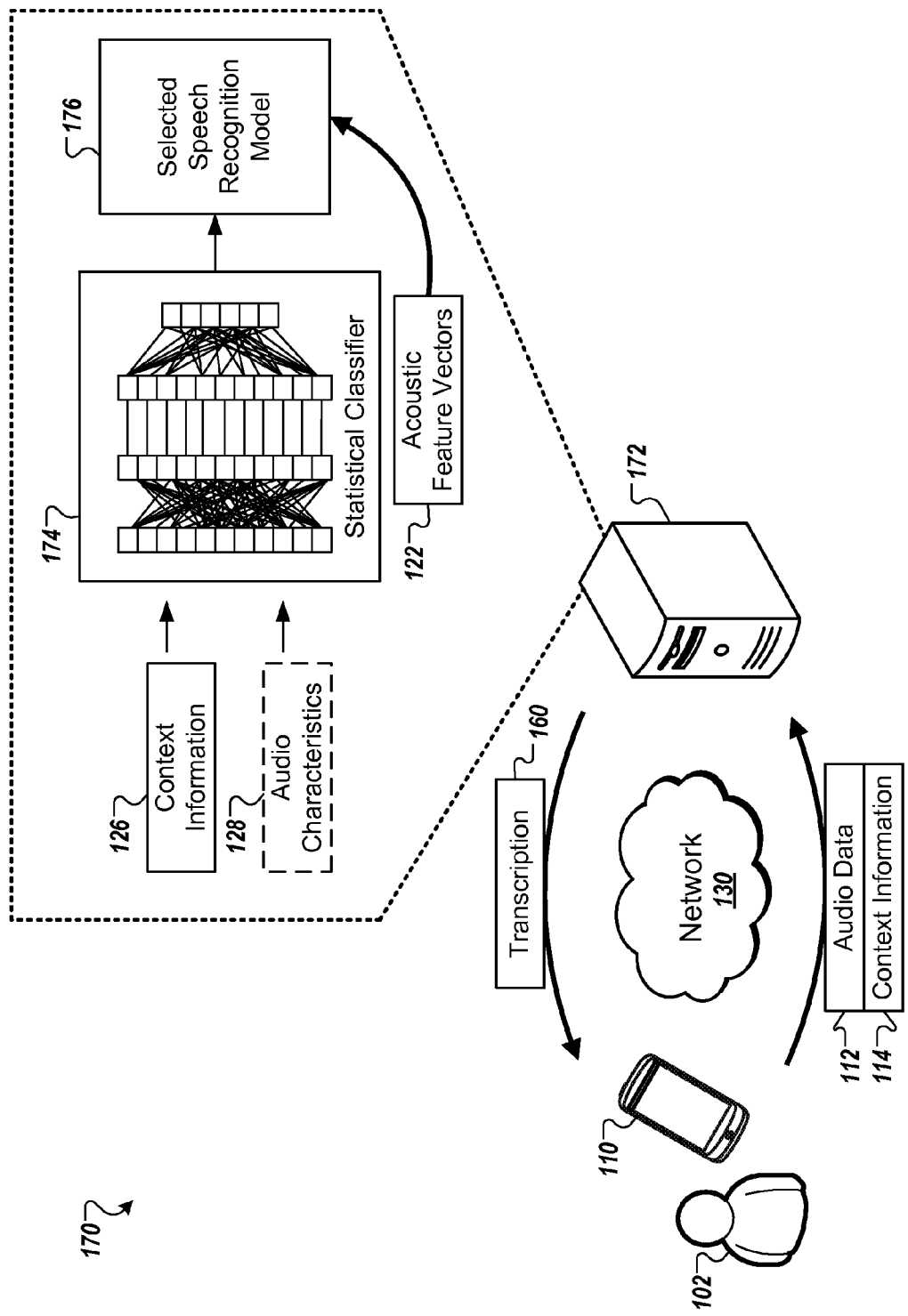
FIG. 1B is a block diagram that illustrates an example of a system for speech recognition using statistical classifiers.

FIG. 1B illustrates an example of a system 170 for speech recognition using statistical classifiers. The system 170 is similar to the system 100 described with reference to FIG. 1A. However, instead of a computing system 120 that provides feature vectors 122, context information 126, and audio characteristics 128 to a neural network 140, the system 170 includes a computing system 172 that inputs the context information 126 and optionally the audio characteristics 128 to a statistical classifier 174. The computing system 172 then selects a speech recognition model 176 based on the output of the statistical classifier 174. The speech recognition model 176 may be a particular speech recognition model that corresponds to a language and/or an accent of the speaker 102. For example, the output of the statistical classifier 174 may identify a particular speech recognition model from a collection of speech recognition models, each of which corresponds to a different language (e.g., English, Japanese, or Spanish), and/or accent (e.g., American English, British English, or Indian English). The collection of speech recognition models may be stored on the storage device local to the computing system 172, or may be external to the computing system 172.

In some implementations, the statistical classifier 174 may be, for example, a supervised learning model such as a multi-way support vector machine (SVM) or a logistic regression classifier that analyzes the inputs and makes a determination about which speech recognition model should be used to transcribe the particular audio signal 112. The statistical classifier 174 may be trained using a set of training examples, where each training example is marked as belonging to a category corresponding to a particular speech recognition model. The statistical classifier 174 then builds a model that assigns new examples to each of the categories. In operation, the statistical classifier 174 receives the set of inputs corresponding to the context information 126 and optionally the audio characteristics 128, and classifies the inputs according to these categories. The classifications may be represented by probabilities or likelihoods that the inputs correspond to a particular speech recognition model. For example, the statistical classifier 174 can indicate an 80% probability that the inputs correspond to Brazilian Portuguese, an 18% probability of French, and a 2% probability of Italian.

In some implementations, the statistical classifier 174 may rank the outputs of each of a variety of speech recognition models in order of likelihood and combine their outputs into a single output. In other words, rather than selecting a single speech recognition model, the statistical classifier 174 may generate a combination of speech recognizer hypotheses based on likelihoods.

The computing system 172 then selects a speech recognition model based on the output of the statistical classifier 174. For example, the computing system 172 may select the speech recognition model having the highest probability. To continue the example above, the computing system 172 may select a speech recognition model corresponding to Brazilian Portuguese. In some cases, the computing system 172 may apply a minimum threshold probability to the selection. In such instances, where the statistical classifier 174 does not identify a speech recognition model as having a probability that exceeds the threshold, the computing system 172 may select a default speech recognition model, may prompt the user for additional information, and/or may cause an error message to be outputted to the user 102 (e.g., "please say that again," or "please provide additional information").

The computing system 172 then generates a transcription from the acoustic feature vectors 122 using the selected speech recognition model. In some implementations, the speech recognition model may be external to the computing system 172, in which case the computing system 172 routes the acoustic feature vectors 122 to the appropriate speech recognition model and then receives a transcription in response. The transcription 160 may then be transmitted back to the client device 110 via the network 130.

FIG. 2A is a diagram 200 that illustrates an example of processing for speech recognition using neural networks. The operations discussed are described as being performed by the computing system 120, but may be performed by other systems, including combinations of multiple computing systems.

The computing system 120 receives data about an audio signal 210 that includes speech to be recognized. The computing system 120 or another system then performs feature extraction on the audio signal 210. For example, the computing system 120 analyzes different segments or analysis windows 220 of the audio signal 210. The windows 220 are labeled $w_0 \ldots w_n$, and as illustrated, the windows 220 can overlap. For example, each window 220 may include 25 ms of the audio signal 210, and a new window 220 may begin every 10 ms. For example, the window 220 labeled $w_0$ may represent the portion of audio signal 210 from a start time of 0 ms to an end time of 25 ms, and the next window 220, labeled $w_1$, may represent the portion of audio signal 120 from a start time of 10 ms to an end time of 35 ms. In this manner, each window 220 includes 15 ms of the audio signal 210 that is included in the previous window 220.

The computing system 120 performs a Fast Fourier Transform (FFT) on the audio in each window 220. The results of the FFT are shown as time-frequency representations 230 of the audio in each window 220. From the FFT data for a window 220, the computing system 120 extracts features that are represented as an acoustic feature vector 240 for the window 220. The acoustic features may be determined by binning according to filterbank energy coefficients, using a mel-frequency cepstral coefficient (MFCC) transform, using a perceptual linear prediction (PLP) transform, or using other techniques. In some implementations, the logarithm of the energy in each of various bands of the FFT may be used to determine acoustic features.

The acoustic feature vectors 240, labeled $v_1 \ldots v_n$, include values corresponding to each of multiple dimensions. As an example, each acoustic feature vector 240 may include a value for a PLP feature, a value for a first order temporal difference, and a value for a second order temporal difference, for each of 13 dimensions, for a total of 39 dimensions per acoustic feature vector 240. Each acoustic feature vector 240 represents characteristics of the portion of the audio signal 210 within its corresponding window 220.

The computing system 120 also generates data 255 corresponding to context information. Context information may be obtained from the client device 110 and/or obtained by the computing system 120 based on information received from the client device. Computing system 122 then processes the context information to generate the data 255 as described below with reference to FIG. 3B.

In some implementations, the computing system 120 may also obtain an i-vector 250. For example, the computing system 120 may process the audio signal 210 with an acoustic model 260 to obtain the i-vector 250. In the example, the i-vector 250 indicates latent variables of multivariate factor analysis. The i-vector 250 may be normalized, for example, to have a zero mean unit variance. In addition, or as an alternative, the i-vector 250 may be projected, for example, using principal component analysis (PCA) or linear discriminant analysis (LDA). Techniques for obtaining an i-vector are described further below with respect to FIG. 3A.

The computing system 120 uses a neural network 270 that can serve as an acoustic model and indicate likelihoods that acoustic feature vectors 240 represent different phonetic units. The neural network 270 includes an input layer 271, a number of hidden layers 272a-272c, and an output layer 273. The neural network 270 receives encoded context information 255 as input as well as receiving acoustic feature vectors 245. Many typical neural networks used for speech recognition include input connections for receiving only acoustic feature information. By contrast, the neural network 270 receives acoustic feature information augmented with additional information such as context information and optionally an i-vector. For example, the first hidden layer 272a has connections from the context information portion and the i-vector input portion of the input layer 271, where such connections are not present in typical neural networks used for speech recognition.

The neural network 270 has been trained to estimate likelihoods that a combination of feature vectors, data representing context information, and optionally an i-vector represent particular phonetic units. For example, during training, input to the neural network 270 may be a combination of acoustic feature vectors, data representing context information and an i-vector corresponding to the utterance from which the acoustic feature vectors were derived. Many inputs combining acoustic feature vectors, context information, and an i-vector can be used to train the neural network 270, and the various training data sets can include acoustic feature vectors, context information, and i-vectors derived from utterances from multiple speakers.

To recognize speech in the audio signal 210 using the neural network 270, the computing system 120 inputs context information 255, and optionally the i-vector 250 at the input layer 271 of the neural network 270 with different sets of acoustic feature vectors 240. In the example, the neural network 270 receives a set 245 of acoustic feature vectors 240 that includes (i) an acoustic feature vector 240 for a window 220 of speech to be recognized and (ii) one or more acoustic feature vectors 240 that serve as context. The set 245 can include acoustic feature vectors 240 corresponding to a predefined number of consecutive windows 220. In the example, the set 245 includes the acoustic feature vector 240 labeled $v_1$, which indicates features of audio in the window 220 labeled $w_1$. As context for this feature vector, the set 245 also includes the acoustic feature vectors 240 labeled $v_0$ and $v_2$, which respectively indicate features of audio in the windows 220 immediately preceding and immediately following the window 220 labeled $w_1$. The set 245 of acoustic feature vectors 240, the context information 255, and optionally the i-vector 250 are concatenated or stacked together to form the complete input to the neural network 270.

At the output layer 273, the neural network 270 indicates likelihoods that the speech in the window 220 under analysis (e.g., the window $w_1$ corresponding to acoustic feature vector $v_1$) corresponds to specific phonetic units. In some implementations, the phonetic units used are phones or components of phones. In the example, the potential phones are referred to as $s_0 \ldots s_m$. The phones may be any of the various phones in speech, such as an "ah" phone, an "ae" phone, a "zh" phone, and so on. The phones $s_0 \ldots s_m$ may include all of the possible phones that may occur in the audio signal 210, or fewer than all of the phones that may occur. Each phone can be divided into three acoustic states.

The output layer 273 provides predictions or probabilities of acoustic states given the data at the input layer 271. The output layer 273 can provide a value, for each state of each phone that indicates the probability that the acoustic feature vector $v_1$ represents the particular state of the particular phone. For example, for a first phone, $s_0$, the output layer 273 can provide a first value that indicates a probability $P(s_{0\_1}|X)$, which indicates a probability that the window $w_1$ includes the first acoustic state of the $s_0$ phone, given the set of input, X, provided at the input layer 271. For a first phone, $s_1$, the output layer 273 can provide a second value indicating a probability $P(s_{0\_2}|X)$, indicating a probability that the window $w_1$ includes the second acoustic state of the $s_0$ phone, given the set of input, X, provided at the input layer 271. Similar outputs can be provided for all states of all of the phones $s_0 \ldots s_m$.

The computing system 120 provides different sets of acoustic feature vectors 240 to the neural network 270 to receive predictions or probabilities of the acoustic states in the different windows 220. The computing system 120 may apply a sliding window to the acoustic feature vectors 240 to select different sets. In the example, the sliding window has a size of three acoustic feature vectors 240. For example, the computing system 120 may provide acoustic feature vectors 240 $v_1$, $v_2$, and $v_3$, the context information 255, and the i-vector 250 as input to the neural network 270 to obtain output values regarding the speech in window $w_2$. The computing system 120 may provide acoustic feature vectors 240 $v_2$, $v_3$, and $v_4$, the context information 255, and the i-vector 250 as input to the neural network 270 to obtain output values regarding the speech in the window $w_3$. In this manner, the computing system 120 may obtain outputs corresponding to each position of the sliding window across the acoustic feature vectors 240.

As the sliding window is moved across the acoustic feature vectors 240 and different sets of acoustic feature vectors 240 are input to the neural network 270, the same context information 255 and i-vector 250 may be included in the input. The context information 255 represents information associated with the audio signal 210 as a whole and therefore is not related to the particular acoustic states in the specific windows 220. Likewise, the i-vector 250 indicates constant or overall properties of the audio signal 210 as a whole. As a result, the information in the i-vector 250 is independent of the particular acoustic states that may occur at specific windows 220.

The output of the neural network 270 is provided to a set of weighted finite state transducers that represents a language model composed with context information, a lexicon, and a grammar. The set of weighted finite state transducers can approximate an HMM. The weighted finite state transducers output a word lattice that the computing system 120 can use to determine a transcription for the audio signal.

As indicated above, each output from the neural network 270 can include a posterior probability $P(state|X)$, representing a likelihood of a particular acoustic state given the current set of input data, X. In some implementations, the computing system 120 divides the posterior, $P(state|X)$ by the prior, $P(state)$, to generate a scaled posterior probability for each output. The resulting scaled posterior probabilities are then input to the weighted finite state transducers for further processing.

Figure 2:
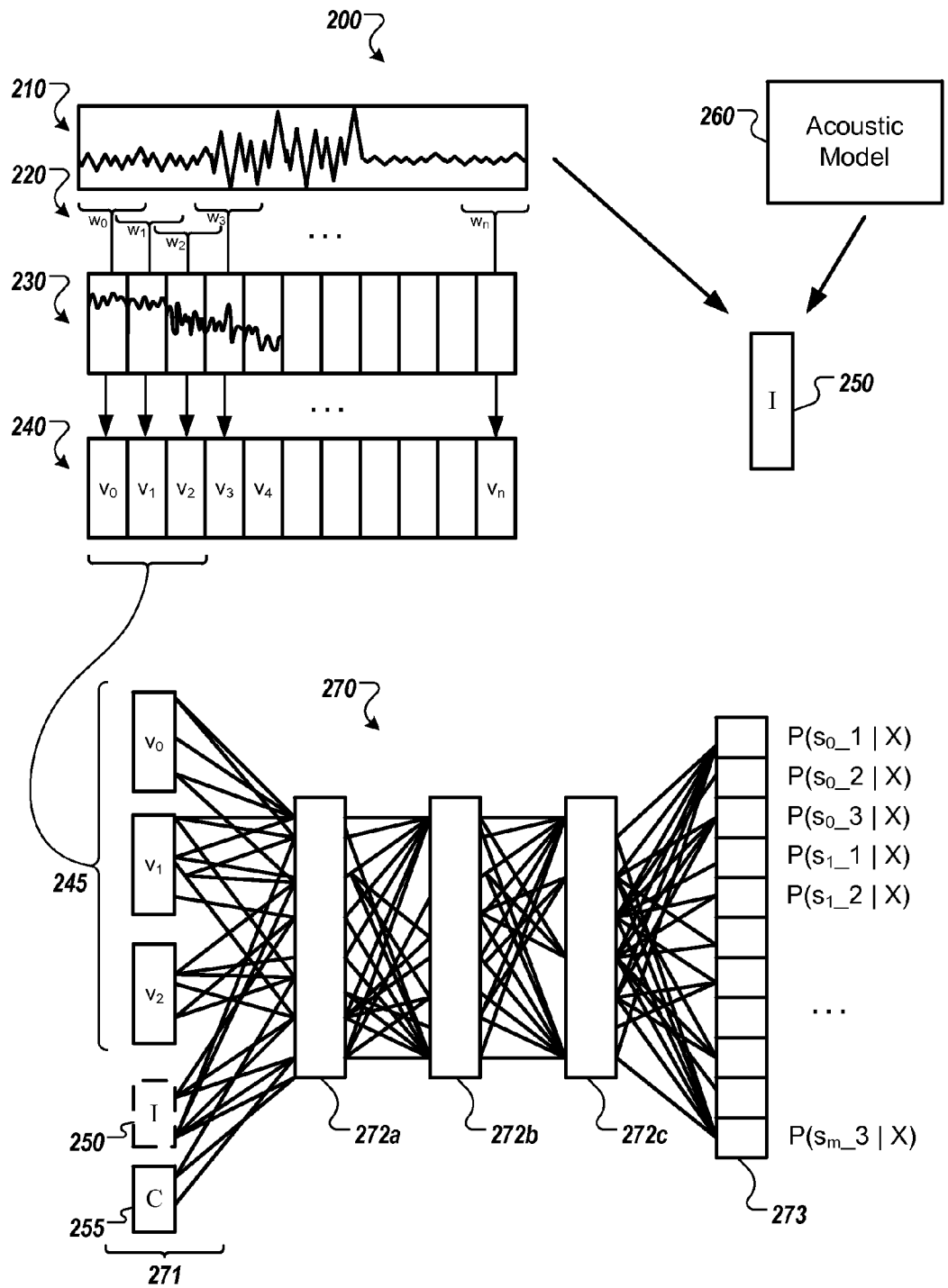
FIG. 2 is a diagram that illustrates an example of processing for speech recognition using neural networks.

In the example of FIG. 2, the sliding window of acoustic feature vectors 240 includes three acoustic feature vectors 240. More or fewer acoustic feature vectors 240 may be provided in each set of input to the neural network 270. For example, 2, 3, 5, 10, or another number of feature vectors for windows 220 before and after a central vector may be input simultaneously to the neural network 270.

In some implementations, the i-vector 250 is a current utterance i-vector derived from the current utterance (e.g., the particular audio signal 210) being recognized. In some implementations, the i-vector 250 is derived from audio signals other than the audio signal 210 containing the utterances being recognized. For example, the i-vector 250 may be derived from a prior utterance of the same speaker whose utterances are included in the audio signal 210.

In some implementations, the i-vector 250 may be a speaker i-vector that is pre-computed for a particular speaker using multiple utterances of the speaker (e.g., utterances from multiple different recording sessions, such as recordings on different days). To generate a speaker i-vector, an i-vector can be determined for each utterance in a set of multiple utterances of the speaker. The i-vectors can be averaged together to obtain generate the speaker i-vector. In some implementations, where a speaker i-vector is used rather than an utterance i-vector derived from the utterance being recognized, post processing may include discriminative training, such as LDA, to identify attributes that are indicative of speaker characteristics. For example, various techniques can be used to isolate speaker characteristics, independent of noise, room characteristics, and other non-speaker-dependent characteristics.

Unlike an i-vector computed using the actual audio signal 210 being recognized, i-vectors derived from prior utterances may not reflect the particular background noise characteristics of the audio signal 210. These i-vectors will indicate characteristics of the speaker's voice and speaking style and are thus useful in recognition. In addition, the noise in prior utterances may be similar to the noise in the current utterance. The speaker i-vector may be calculated from a set recent utterances, such as a predetermined number of most recent utterances or audio acquired within a threshold time period, which may approximate the noise conditions of the current utterance if the recent utterances were recorded in a similar setting.

Recognition latency may be reduced by using i-vectors that are computed prior to receiving some or all of the audio signal 210. For example, the computing system 120 may use a pre-computed i-vector derived from other utterances to begin recognizing initial portions of the audio signal 210, without waiting for the entire audio signal 210 to be received. Thus the recognition techniques described above may be used in a continuous speech recognition or "streaming" scenario in which recognition proceeds while audio streams in.

In some implementations, the computing system 120 may identify the speaker and select an i-vector based on the speaker's identity. An i-vector may be calculated for each of multiple users, and the i-vectors may be stored for later use in recognizing speech of the corresponding users. The computing system 120 may receive a device identifier for a device, such as a mobile phone, that the speaker is using to record speech. In addition, or as an alternative, the computing system 120 may receive a user identifier that identifies the user, such as a name or user account login. The computing system 120 may identify the speaker as a user that owns the device or a user is logged into a user account on the device. In some implementations, the computing system 120 may identify the speaker before recognition begins, or before audio is received during the current session. The computing system 120 may then look up the i-vector that corresponds to the identified user and use that i-vector to recognize received speech.

In some implementations, a successive approximation technique may be used to approximate and re-estimate the i-vector 250 while audio is received. The i-vector 250 may be re-estimated at a predetermined interval, for example, each time a threshold amount of new audio has been received. For example, a first i-vector may be estimated using the initial three seconds of audio received. Then, after another three seconds of audio has been received, a second i-vector may be estimated using the six seconds of audio received so far. After another three seconds, a third i-vector may be estimated using all nine seconds of audio received, and so on. The re-estimation period may occur at longer intervals, such as 10 seconds or 30 seconds, to reduce the amount of computation required. In some implementations, i-vectors are re-estimated at pauses in speech (e.g., as detected by a speech energy or voice activity detection algorithm), rather than at predetermined intervals.

An i-vector derived from a small segment of an utterance may introduce some inaccuracy compared to an i-vector for the entire utterance, but as more audio is received, the estimated i-vectors approach the accuracy of an i-vector derived from the whole utterance. In addition, audio from recent utterances (e.g., audio from a predetermined number of most recent utterances or audio acquired within a threshold period of the current time) may be used with received audio to estimate the i-vectors, which may further reduce any inaccuracy present in the estimates.

In some implementations, the computing system 120 transitions from using a first i-vector to a second i-vector during recognition of an utterance. For example, the computing system 120 may begin by using a first i-vector derived from a previous utterance. After a threshold amount of audio has been received (e.g., 3, 5, 10, or 30 seconds), the computing system 120 generates a second i-vector based on the audio received in the current session and uses the second i-vector to process subsequently received audio.

In some implementations, to reduce latency, the computing system 120 may recognize the initial portion of an utterance with an acoustic model that does not receive an i-vector as input. For example, a neural network trained as an acoustic model using only acoustic feature vectors as inputs or another acoustic model may be used. After receiving a threshold amount of audio that permits reliable estimation of an i-vector, an i-vector is been calculated based on the received audio. The computing system 120 may then switch from recognizing received audio using the neural network that does not receive i-vectors to recognizing speech using the neural network 270 that has been augmented to receive i-vectors as input.

Figure 3A:
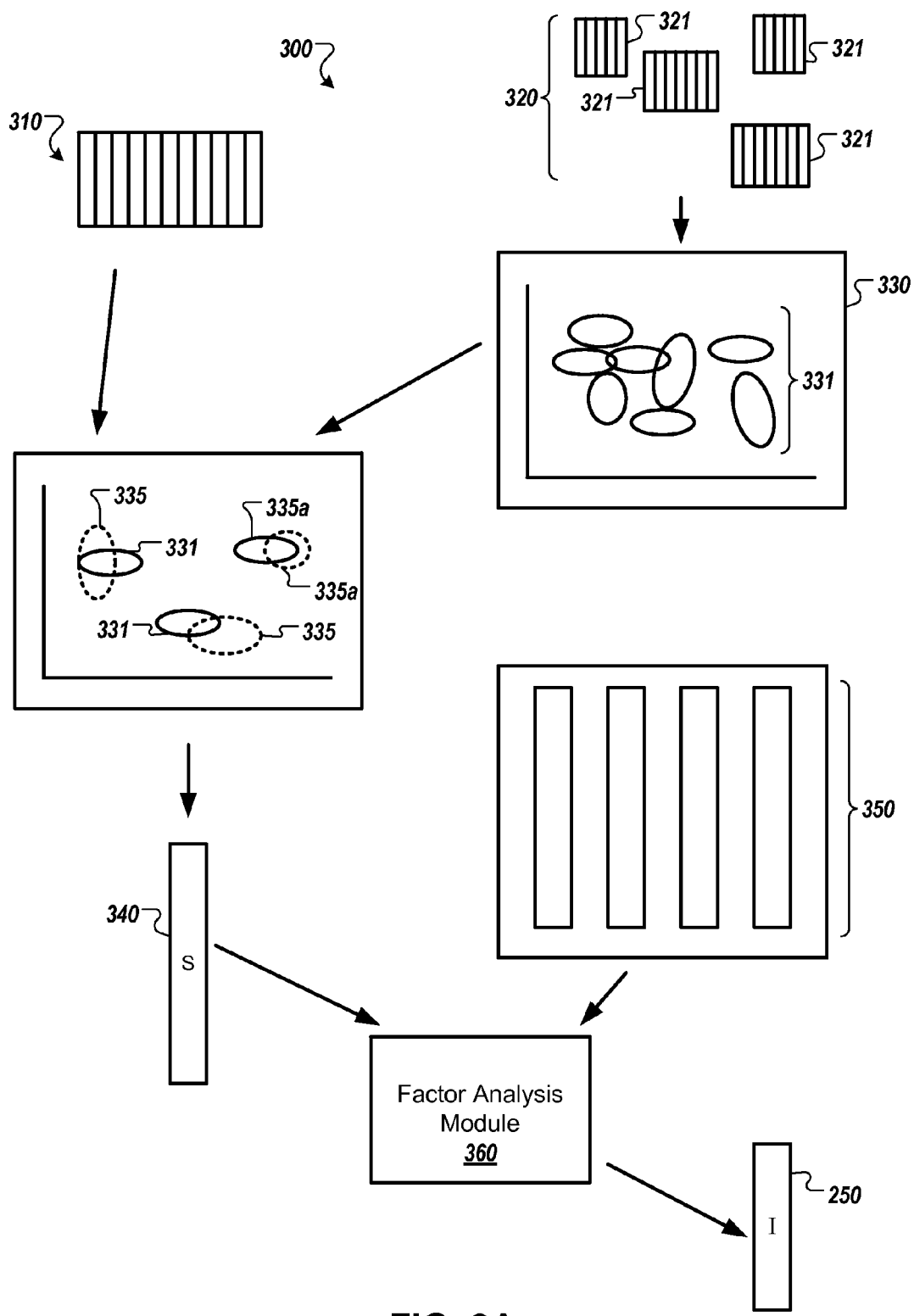
FIG. 3A is a diagram that illustrates an example of processing to generate latent variables of factor analysis.

FIG. 3A is a diagram 300 that illustrates an example of processing to generate latent variables of factor analysis. The example of FIG. 3A shows techniques for determining an i-vector, which includes these latent variables of factor analysis. I-vectors are time-independent components that represent overall characteristics of an audio signal rather than characteristics at a specific segment of time within an utterance. I-vectors can summarize a variety of characteristics of audio that are independent of the phonetic units spoken, for example, information indicative of the identity and/or accent of the speaker, the language spoken, recording channel properties, and noise characteristics.

The example of FIG. 3A illustrates processing to calculate an i-vector 250 for a sample utterance 310. The computing system 120 accesses training data 320 that includes a number of utterances 321. The training data 320 may include utterances 321 including speech from different speakers, utterances 321 having different background noise conditions, and utterances 321 having other differences. Each of the utterances 321 is represented as a set of acoustic feature vectors. Each of the acoustic feature vectors can be, for example, a 39-dimensional vector determined in the same manner that the acoustic feature vectors 240 are determined in the example of FIG. 2.

The computing system 120 uses the utterances 321 to train a Gaussian mixture model (GMM) 330. For example, the GMM 330 may include 1000 39-dimensional Gaussians 331. The GMM 330 is trained using the acoustic feature vectors of the utterances 321 regardless of the phones or acoustic states that the acoustic feature vectors represent. As a result, acoustic feature vectors corresponding to different phones and acoustic states are used to train the GMM 330. For example, all of the acoustic feature vectors from all of the utterances 321 in the training data 320 can be used to train the GMM 330. In this respect, the GMM 330 is different from GMMs that are trained with only the acoustic feature vectors for a single phone or a single acoustic state.

When the sample utterance 310 is received, the computing system 120 determines acoustic feature vectors that describe the utterance 310. The computing system 120 classifies the acoustic feature vectors of the utterance 310 using the GMM 330. For example, the Gaussian 331 that corresponds to each acoustic feature vector of the sample utterance 310 may be identified. The computing system 120 then re-estimates the Gaussians 331 that are observed in the sample utterance 310, illustrated as re-estimated Gaussians 335 shown in dashed lines. As an example, a set of one or more acoustic feature vectors of the sample utterance 310 may be classified as matching a particular Gaussian 331a from the GMM 330. Based on this set of acoustic feature vectors, the computing system 120 calculates a re-estimated Gaussian 335a having a mean and/or variance different from the Gaussian 331a. Typically, only some of the Gaussians 331 in the GMM 330 are observed in the sample utterance 310 and re-estimated.

The computing system 120 then identifies differences between the Gaussians 331 and the corresponding re-estimated Gaussians 335. For example, the computing system 120 may generate difference vectors that each indicate changes in parameters between a Gaussian 331 and its corresponding re-estimated Gaussian 335. Since each of the Gaussians is 39-dimensional, each difference vector can have 39 values, where each value indicates a change in one of the 39 dimensions.

The computing system 120 concatenates or stacks the difference vectors to generate a supervector 340. Because only some of the Gaussians 331 were observed and re-estimated, a value of zero (e.g., indicating no change from the original Gaussian 331) is included in the supervector 340 for each the 39 dimensions of each Gaussian 331 that was not observed in the sample utterance 310. For a GMM 330 having 1000 Gaussians that are each 39-dimensional, the supervector 340 would include 39,000 elements. In many instances, Gaussians 331 and the corresponding re-estimated Gaussians 335 differ only in their mean values. The supervector 340 can represent the differences between the mean values of the Gaussians 331 and the mean values of the corresponding re-estimated Gaussians 335.

In addition to generating the supervector 340, the computing system 120 also generates a count vector 345 for the utterance 310. The values in the count vector 345 can represent $0^{th}$ order Baum-Welch statistics, referred to as counts or accumulated posteriors. The count vector 345 can indicate the relative importance of the Gaussians 331 in the GMM 330. The count vector 345 includes a value for each Gaussian 331 in the GMM 330. As a result, for a GMM 330 having 1000 Gaussians, the count vector 345 for the utterance 310 would include 1,000 elements. Each value in the vector 345 can be the sum of the posterior probabilities of the feature vectors of the utterance 310 with respect to a particular Gaussian 331. For example, for a first Gaussian 331a, the posterior probability of each feature vector in the utterance 310 is computed (e.g., the probability of occurrence of the feature vector as indicated by the first Gaussian 331a). The sum of the posterior probabilities for the feature vectors in the utterance 310 is used as the value for the first Gaussian 331a in the count vector 345. Posterior probabilities for the each feature vector in the utterance 310 can be calculated and summed for each of the other Gaussians 331 to complete the count vector 345.

In the same manner that the supervector 340 and count vector 345 was generated for the sample utterance 310, the computing system 120 generates a supervector 350 and a count vector 355 for each of the utterances 321 in the training data 320. The GMM 330, the supervectors 350, and the count vectors 355 may be generated and stored before receiving the sample utterance 310. Then, when the sample utterance 310 is received, the previously generated GMM 330, supervectors 350, and count vectors can be accessed from storage, which limits the amount of computation necessary to generate an i-vector for the sample utterance 310.

The computing system 120 uses the supervectors 350 to create a factor analysis module 360. The factor analysis module 360, like the GMM 330 and the supervectors 350, may be generated in advance of receiving the sample utterance 310. The factor analysis module 360 can perform multivariate factor analysis to project a supervector to a lower-dimensional vector that represents particular factors of interest. For example, the factor analysis module may project a supervector of 39,000 elements to a vector of only a few thousand elements or only a few hundred elements.

The factor analysis module 360, like the GMM 330, is trained using a collection of utterances, which may be the utterances in the same training data 320 used to generate the GMM 330. An adapted or re-estimated GMM may be determined for each of the i utterances $[U_1, U_2, \ldots, U_i]$ in the training data 320, in the same manner that the re-estimated Gaussians 335 are determined for the utterance 310. A supervector 350 $[S_1, S_2, \ldots, S_i]$ and count vector 355 $[C_1, C_2, \ldots, C_i]$ for each utterance $[U_1, U_2, \ldots, U_i]$ is also determined. Using the vector pairs $[S_i, C_i]$ for each utterance, the factor analysis module 360 is trained to learn the common range of movement of the adapted or re-estimated GMMs for the utterances $[U_1, U_2, \ldots, U_i]$ relative to the general GMM 330. Difference parameters between re-estimated GMMs and the GMM 330 are then constrained to move only over the identified common directions of movement in the space of the supervectors. Movement is limited to a manifold, and the variables that describe the position of the difference parameters over the manifold are denoted as i-vectors. As a result, the factor analysis module 360 learns a correspondence $[S_i, C_i]$-->i-vector$_i$, such that $S_i/C_i$=f(i-vector$_i$), where f( ) is a linear function f(x)=T*x and T is a matrix.

The computing system 120 inputs the supervector 340 and count vector 345 for the sample utterance 310 to the trained factor analysis module 360. The output of the factor analysis module 360 is the i-vector 250, which includes latent variables of multivariate factor analysis. The i-vector 250 represents time-independent characteristics of the sample utterance 310 rather than characteristics of a particular window or subset of windows within the sample utterance 310. In some implementations, the i-vector 250 may include, for example, approximately 300 elements.

Figure 3B:
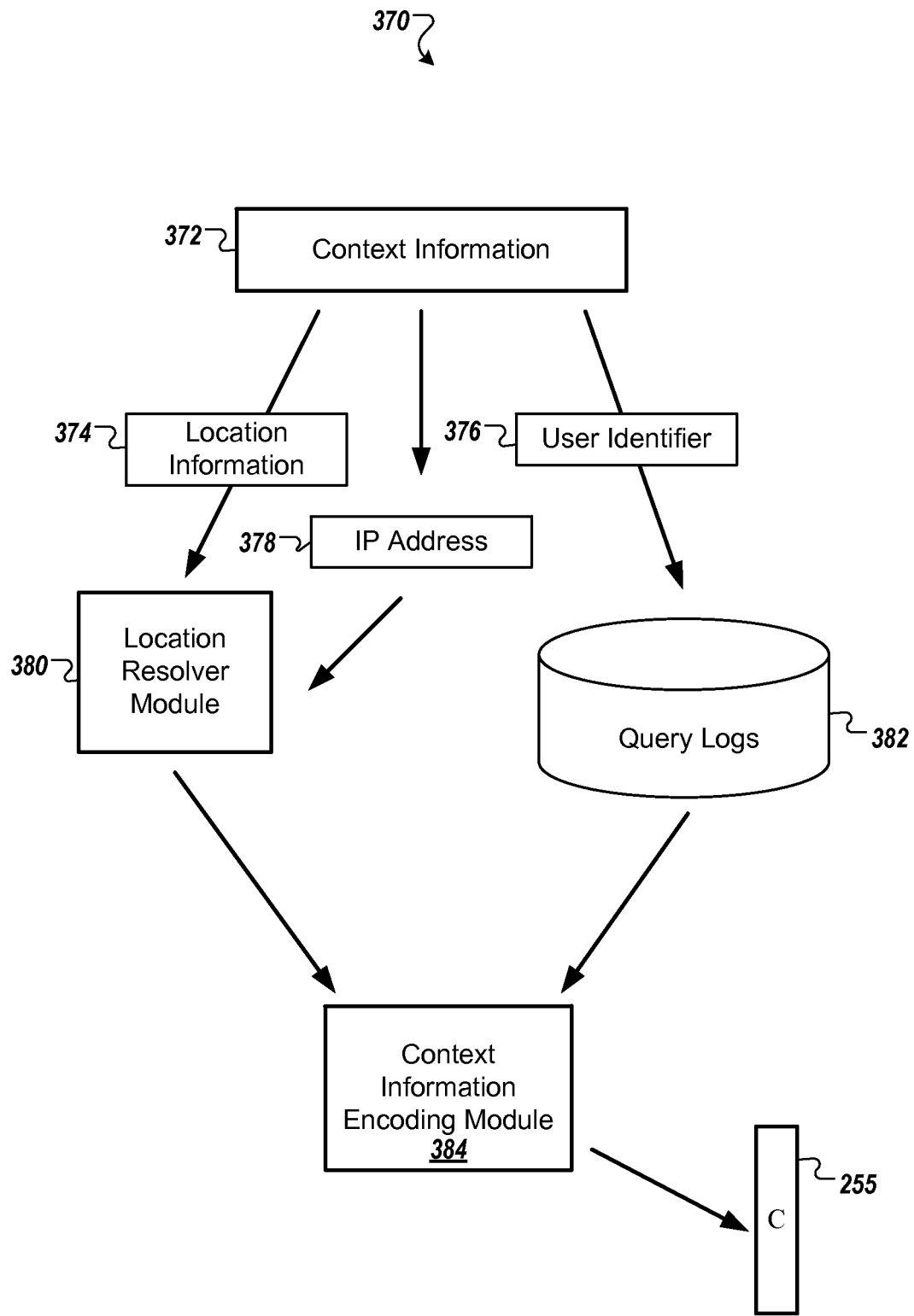
FIG. 3B is a diagram that illustrates an example of processing context information to generate inputs for a neural network.

FIG. 3B is a diagram 370 that illustrates an example of processing context information to generate inputs for a neural network. The example of FIG. 3B shows techniques for determining a set of data corresponding to context information that is suitable for input to a neural network. The context information may be information about the user, the client device, and/or the circumstances in which the utterance was made, which was not derived from the received audio signal or another audio signal. For example, the context information may include a geographic location, an IP address, search history information, phone usage records, types of calls, language of transcribed voicemails, language from emails or text messages, Internet browsing history, billing information, recorded and scheduled shows on a digital video recorder (DVR), demographic information about the user, or any other suitable information.

The example of FIG. 3B illustrates processing context information to generate inputs suitable for a neural network. The system 370 receives context information 372 that may be from a client device and/or network devices. The context information may include, among other things, location information 374, a user identifier 376, and an IP address 378.

The location information 374 may include a latitude and longitude from a GPS device located at the client device, and/or wireless network data collected at the client device such as cellular tower identifiers or Wi-Fi signatures. The location information 374 is provided as an input to a location resolver module 380 that correlates locations to regions having particular languages and/or accents. The IP address 378 can also generally be resolved to a location associated with the client device, although the location identified by the IP address 378 may not necessarily be the same as (or as accurate as) the location indicated by the location information 374. However, the IP address may indicate a place of origin of a client device, which may more accurately correlate with the user's probably language and/or accent than the current location of the client device. For example, the IP address 378 may be a dynamic IP address allocated to the client device by the network that does not indicate the current location of the client device.

In operation, for example, the location resolver module 380 may determine that locations that correspond to the United States may correlate to an American English region, locations that correspond to the United Kingdom may correlate to a British English region, and locations that correspond to Brazil may correlate to a Brazilian Portuguese region. These regions need not correspond to countries, and any particular country may include a number of regions. For example, the People's Republic of China may include a Mandarin region and a Cantonese region among others. As another example, a Central American region may include a number of Spanish-speaking countries. The location resolver module 380 may include, for example, a database and/or table that associates geographic locations (e.g., latitude and longitude) with these language regions.

In some cases, the location resolver module 380 may determine one region on the basis of the location information 374 and a different region on the basis of the IP address 378. In such instances, the location resolver module 380 may output a region corresponding to the location information 374, the region corresponding to the IP address 378, or both. In some implementations, the region corresponding to the IP address 378 may be weighted more or less heavily as an input to the neural network than the region corresponding to the location information 374.

In addition to location information 374 and IP address 378 the request from the client device may include a user identifier 376. The system 370 may look up information about the user associated with the user identifier 376 from various sources such as search history query logs 382. This information associated with the user identifier 376 may include, for example, search queries entered by the user, resources accessed by the user, media viewed by the user, or any other historical information about the user. For example, the system 370 may analyze previous logs for clicks the user has made with the search engine. If the user clicks on results for an Indian version of the search engine, then it is more likely that an Indian English speech model will be relevant to that user. Likewise, if the user consistently views French language media, then it is more likely that a French speech model will be relevant to that user. The information associated with the user identifier 376 may be encoded in any suitable manner. For example, the number of clicks and/or views of media associated with each of a number of languages and/or accents may be tallied, and the results used to generate a vector including elements corresponding to the various languages and/or accents. Alternatively or in addition, data identifying the language and/or accent having the highest number of clicks and/or views may be encoded.

Typically, categorical and qualitative data is encoded so that it can be processed by a neural network. The system 370 therefore provides the output of the location resolver module 380 and the data obtained using the user identifier 376 to a context information encoding module 384, which encodes the context information so that it can be provided to the neural network. For example, the language regions identified by the location resolver module 380 may be encoded using categorical encoding methods such as, for example, ordinal encoding, 1-of-N encoding, and/or 1-of-(N−1) encoding. Historical information and demographic associated with the user may be encoded in a similar manner, and/or may be encoded as vectors including elements for various languages and/or accents. The context information encoding module 384 outputs a set of data 255 corresponding to the context information that is suitable for input into the neural network.

Figure 4:
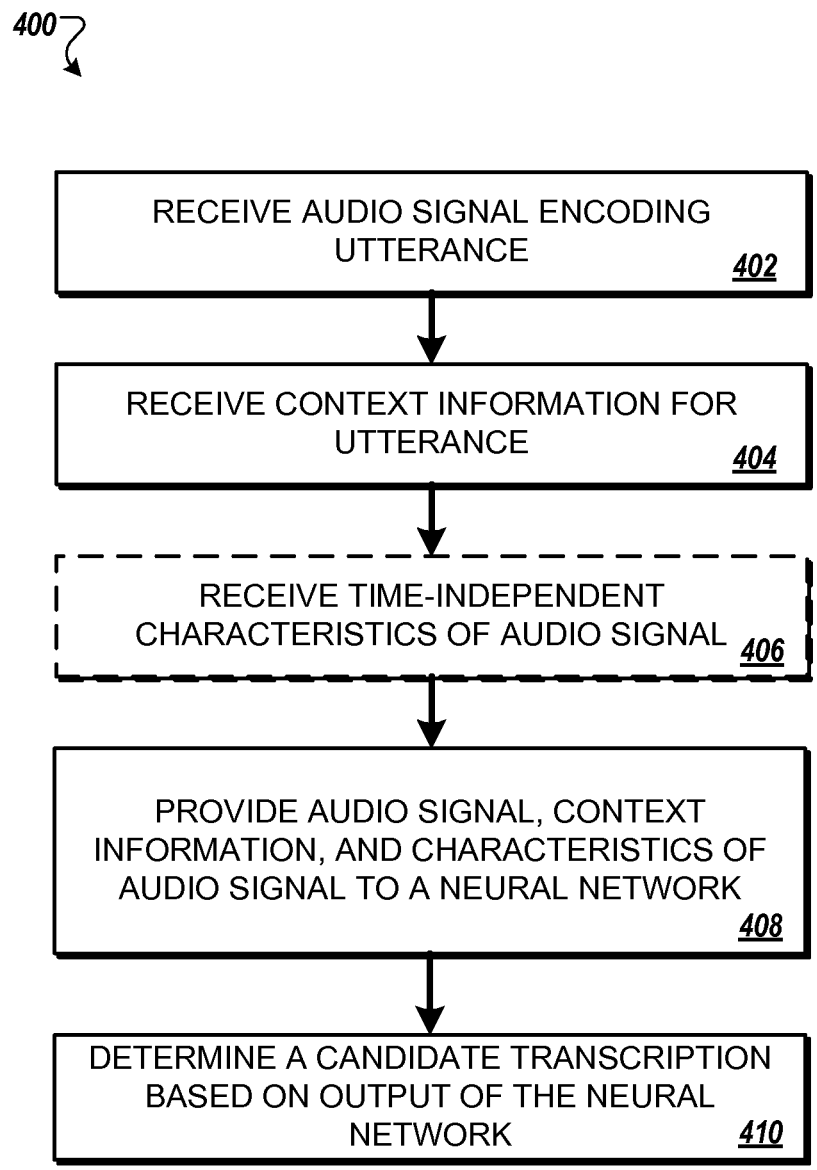
FIG. 4 is a flow diagram that illustrates an example of a process for context-based speech recognition using neural networks.

FIG. 4 shows an example of a process 400 for context-based speech recognition using neural networks. The process 400 may be performed by data processing apparatus, such as the computing system 120 described above or another data processing apparatus.

In step 402, a computing system receives an audio signal encoding a portion of an utterance. The computing system may process the audio signal to obtain one or more feature vectors that model portions of the audio signal. The feature vector(s) can include values that indicate acoustic features for each of multiple dimensions.

Next, in step 404, the computing system receives context information associated with the utterance. The context information 114 is information about the user, the client device, and/or the circumstances in which the utterance was made, which was not derived from the received audio signal or another audio signal. The context information may include, for example, an IP address of the client device from which the audio signal originated, a geographic location of the client device which the audio signal originated, and/or a search history associated with the speaker of the utterance.

In some implementations, the computing system identifies the speaker of the utterance. For example, the computing system may receive an identifier for the speaker or an identifier for a device that records the utterance, and then identify the speaker based on the received identifier. The computing system may then use this identification to obtain information about the speaker, such as, for example, search history, browsing history, or other context information.

Optionally, in step 406, the computing system receives a set of data corresponding to time-independent characteristics of the audio signal that is derived from the received audio signal and/or another audio signal. This set of data may be data indicative of latent variables of multivariate factor analysis. In some implementations, this set of data may be of i-vector. The data can be indicative of latent variables of multivariate factor analysis of the audio signal that includes the utterance to be recognized. The data can be indicative of latent variables of multivariate factor analysis of an audio signal that (i) does not include the utterance and (ii) includes other utterances uttered by the speaker. For example, the data can be derived from speech in a prior recording session or on a different day. The data may be derived from multiple audio signals that include speech of the speaker, recorded on different days or during different recording sessions. In some implementations, an i-vector indicating time-independent audio characteristics may be received.

In some implementations, the data indicative of latent variables may be selected based on the identity of the speaker. For example, data indicating latent variables of multivariate factor analysis may be determined for a particular speaker and stored in association with the identifier, and then may be accessed and used to recognize utterances when the particular speaker is identified as the speaker.

In step 408, the computing system then provides, as input to a neural network, data corresponding to the received audio signal and the context information, and optionally the data corresponding to time independent characteristics of the audio signal. For example, the computing system may provide feature vectors that model portions of the audio signal to the neural network. The computing system may also provide context information encoded using a categorical encoding methods such as, for example, ordinal encoding, 1-of-N encoding, and/or 1-of-(N−1) encoding.

In some implementations, the data corresponding to the received audio signal, context information, and optionally the data corresponding to time independent characteristics of the audio signal are provided concurrently (e.g., at the same time) to the neural network. For example, the feature vector(s) and context information may be combined into a single input vector which is input to the neural network. In this manner, a set of input data to the neural network includes a time-dependent component, e.g., the acoustic feature vector(s) representing characteristics of specific windows of the utterance, and a time-independent component, e.g., context information, and optionally an i-vector of latent variables that represents general characteristics of the utterance as a whole.

The neural network can be a neural network that has been trained using audio feature data, context information, and optionally data indicative of latent variables of multivariate factor analysis corresponding to the audio feature data. The neural network may have been trained to provide estimates of probabilities of one or more phones or acoustic states based on input that includes a combination of one or more feature vectors and data indicative of latent variables of multivariate factor analysis.

Finally, in step 410, the computing system generates a transcription for the utterance based on at least an output of the neural network. For example, the output of the neural network can indicate a likelihood that the feature vector, or the entire set of input to the neural network, corresponds to a particular phonetic unit, and the candidate transcription can be determined based on this likelihood.

Figure 5:
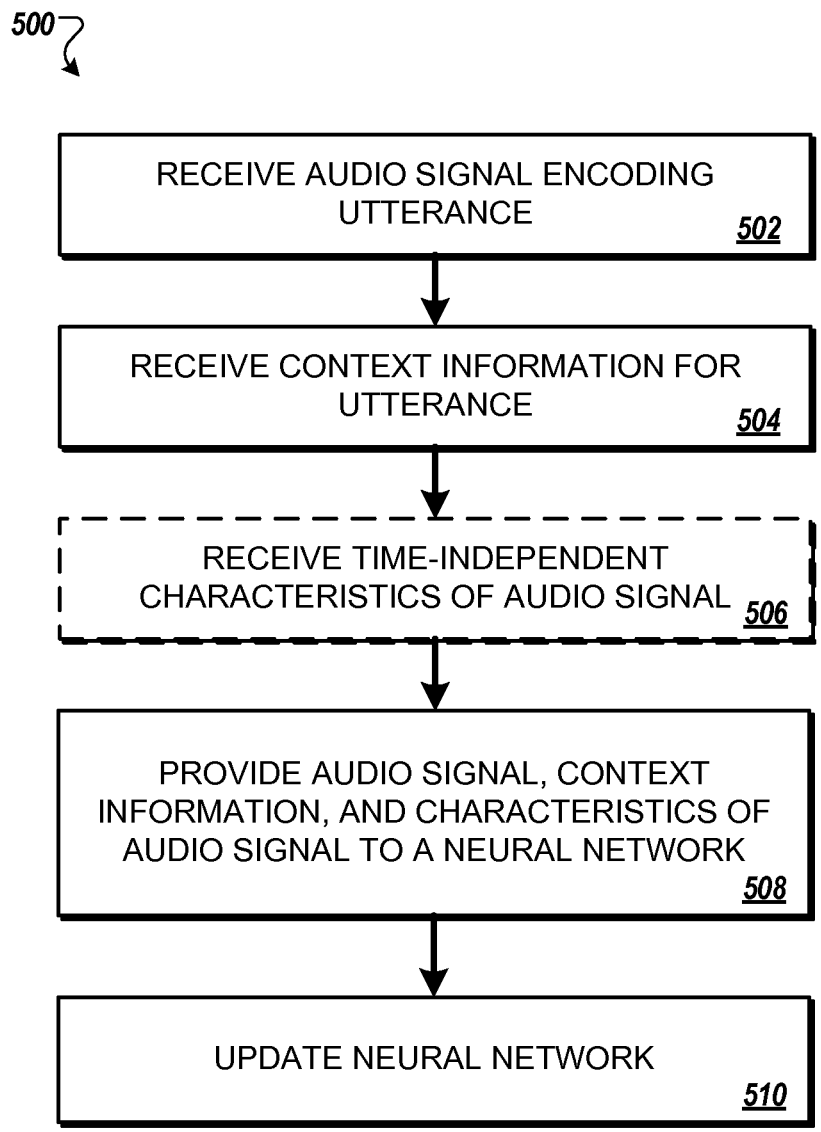
FIG. 5 is a flow diagram that illustrates an example of a process for training a neural network.

FIG. 5 is a flow diagram that illustrates an example of a process 500 for training a neural network. The process 500 may be performed by data processing apparatus, such as the computing system 120 described above or another data processing apparatus.

The computing system receives an audio signal encoding an utterance in step 502. The computing system may derive feature vectors from one or more portions of the audio signal. The feature vectors can include values that indicate acoustic features for each of multiple dimensions. In some implementations, multiple feature vectors are received. For example, a set of acoustic feature vectors that correspond to multiple consecutive windows of an utterance can be received. The set may include a central feature vector and context feature vectors that indicate the context that occurs before and/or after the central feature vector.

Next, in step 504, the computing system receives data corresponding to context information. The context information may include, for example, an IP address of the client device from which the audio signal originated, a geographic location of the client device which the audio signal originated, and/or a search history associated with the speaker of the utterance.

Optionally, in step 506, the computing system receives a set of data corresponding to time-independent characteristics of the audio signal that is derived from the received audio signal and/or another audio signal. This set of data may be data indicative of latent variables of multivariate factor analysis. In some implementations, this set of data may be of i-vector. The computing system then provides the set of data derived from the audio signal along with the data corresponding to the audio signal in the context information as inputs to the neural network. The data can be indicative of latent variables of multivariate factor analysis of the audio signal that includes the utterance to be recognized. The data can be indicative of latent variables of multivariate factor analysis of an audio signal that (i) does not include the utterance and (ii) includes other utterances uttered by the speaker. For example, the data can be derived from speech in a prior recording session or on a different day. The data may be derived from multiple audio signals that include speech of the speaker, recorded on different days or during different recording sessions. In some implementations, an i-vector indicating time-independent audio characteristics may be received.

In step 508, the computing system then provides, as input to a neural network, data corresponding to the received audio signal and the context information, and optionally the data corresponding to time independent characteristics of the audio signal. For example, the computing system may provide feature vectors that model portions of the audio signal to the neural network. The computing system may also provide context information encoded using a categorical encoding methods such as, for example, ordinal encoding, 1-of-N encoding, and/or 1-of-(N−1) encoding.

The neural network is then updated in step 510. Forward propagation through the neural network produces outputs at an output layer of the neural network. The outputs may be compared with data indicating correct or desired outputs that indicate that the received feature vector corresponds to the acoustic state indicated in a received label for the feature vector. A measure of error between the actual outputs of the neural network and the correct or desired outputs is determined. The error is then backpropagated through the neural network to update the weights within the neural network.

The process 500 may be repeated for feature vectors extracted from multiple different utterances in a set of training data and multiple sets of context information. For each utterance or audio recording in the training data, varying context information may also be provided. Whenever a feature vector for a particular utterance is provided as input to the neural network, the context information for the particular utterance may also be input to the neural network at the same time. During training, the frames selected for training can be selected randomly from a large set, so that frames from the same utterance are not processed consecutively.

Figure 6:
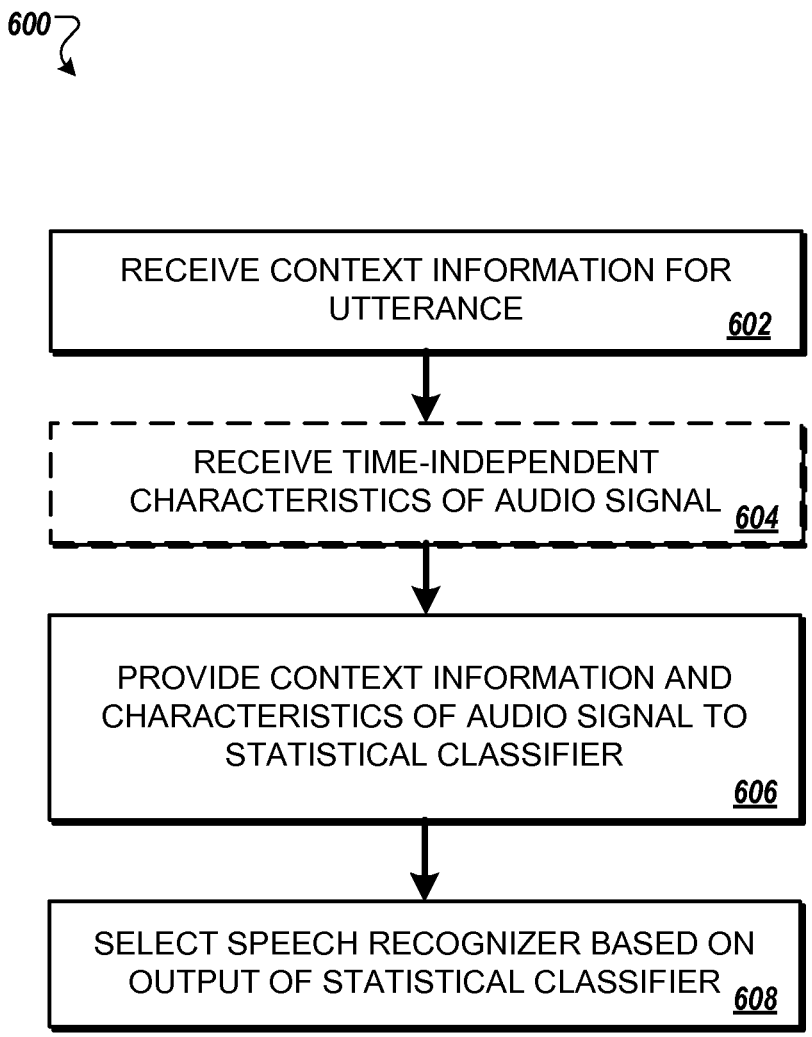
FIG. 6 is a flow diagram that illustrates an example of a process for context-based speech recognition using statistical classifiers.

FIG. 6 is a flow diagram that illustrates an example of a process 600 for context-based speech recognition using statistical classifiers. The process 600 may be performed by data processing apparatus, such as the computing system 172 described above or another data processing apparatus.

In step 602, the computing system receives context information associated with an utterance. The utterance is encoded as an audio signal that is also received by the computing system. The context information may include, for example, an IP address of the client device from which the audio signal originated, a geographic location of the client device which the audio signal originated, and/or a search history associated with the speaker of the utterance.

In some implementations, the computing system identifies the speaker of the utterance. For example, the computing system may receive an identifier for the speaker or an identifier for a device that records the utterance, and then identify the speaker based on the received identifier. The computing system may then use this identification to obtain information about the speaker, such as, for example, search history, browsing history, or other context information.

Optionally, in step 604, the computing system receives a set of data corresponding to time-independent characteristics of the audio signal that is derived from the received audio signal and/or another audio signal. This set of data may be data indicative of latent variables of multivariate factor analysis. In some implementations, this set of data may be of i-vector. The computing system then provides the set of data derived from the audio signal along with the data corresponding to the audio signal in the context information as inputs to the neural network. The data can be indicative of latent variables of multivariate factor analysis of the audio signal that includes the utterance to be recognized. The data can be indicative of latent variables of multivariate factor analysis of an audio signal that (i) does not include the utterance and (ii) includes other utterances uttered by the speaker. For example, the data can be derived from speech in a prior recording session or on a different day. The data may be derived from multiple audio signals that include speech of the speaker, recorded on different days or during different recording sessions. In some implementations, an i-vector indicating time-independent audio characteristics may be received.

Then, in step 606, the computing system provides the context information and optionally the time-independent characteristics of the audio signal to a statistical classifier. The statistical classifier may be, for example, a supervised learning model such as a multi-way support vector machine (SVM) or a logistic regression classifier that analyzes the inputs and makes a determination about which speech recognition model should be used to transcribe the audio signal.

Finally, in step 608, the computing system selects a speech recognizer based on the output of the statistical classifier. For example, the computing system may select one speech recognizer from a number of candidate speech recognizer models, where each candidate speech recognizer model corresponds to a different language and/or accent. In some implementations, the computing system may then generate a transcription of the utterance using the selected speech recognizer.

A number of implementations have been described. Nevertheless, it will be understood that various modifications may be made without departing from the spirit and scope of the disclosure. For example, various forms of the flows shown above may be used, with steps re-ordered, added, or removed.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. A computer-implemented method comprising:
   receiving an audio signal encoding a portion of an utterance;
   receiving context information associated with the utterance, wherein the context information is not derived from the audio signal or any other audio signal;
   generating, for input to a neural network of an automatic speech recognition system and based on characteristics of the context information that existed when the context information was received, characteristic data that corresponds to the context information;
   providing, as input to the neural network of the automatic speech recognition system, data corresponding to the audio signal and the characteristic data that corresponds to the context information; and
   generating a transcription for the utterance based on at least an output of the neural network.

2. The method of claim 1,
   wherein providing, as an input to a neural network, data corresponding to the audio signal and the characteristic data that corresponds to the context information comprises providing, as an input to the neural network, a set of acoustic feature vectors derived from the audio signal.

3. The method of claim 1, wherein receiving context information associated with the utterance comprises receiving an internet protocol (IP) address of a client device from which the audio signal originated.

4. The method of claim 1, wherein receiving context information associated with the utterance comprises receiving a geographic location of a client device from which the audio signal originated.

5. The method of claim 1, wherein receiving context information associated with the utterance comprises receiving a search history associated with a speaker of the utterance.

6. The method of claim 1, further comprising:
   receiving a set of data derived from the audio signal, the set of data corresponding to one or more time-independent characteristics of the audio signal;
   wherein providing, as input to a neural network, data corresponding to the audio signal and the characteristic data that corresponds to the context information comprises providing, as input to the neural network, data corresponding to the audio signal, the characteristic data that corresponds to the context information, and the set of data derived from the audio signal.

7. The method of claim 6, wherein the set of data corresponding to one or more time-independent characteristics of the audio signal includes one or more of a signal corresponding to an accent of a speaker of the utterance, a signal corresponding to background noise of the audio signal, a signal corresponding to recording channel properties of the audio signal, a signal corresponding to a pitch of the speaker, and a signal corresponding to an age of the speaker.

8. A system comprising:
   one or more computers and one or more storage devices storing instructions that are operable, when executed by the one or more computers, to cause the one or more computers to perform operations comprising:
   receiving an audio signal encoding a portion of an utterance;
   receiving context information associated with the utterance, wherein the context information is not derived from the audio signal or any other audio signal;
   generating, for input to a neural network of an automatic speech recognition system and based on characteristics of the context information that existed when the context information was received, characteristic data that corresponds to the context information;
   providing, as input to the neural network of the automatic speech recognition system, data corresponding to the audio signal and the characteristic data that corresponds to the context information; and
   generating a transcription for the utterance based on at least an output of the neural network.

9. The system of claim 8,
   wherein providing, as an input to a neural network, data corresponding to the audio signal and the characteristic data that corresponds to the context information comprises providing, as an input to the neural network, a set of acoustic feature vectors derived from the audio signal.

10. The system of claim 8, wherein receiving context information associated with the utterance comprises receiving an internet protocol (IP) address of a client device from which the audio signal originated.

11. The system of claim 8, wherein receiving context information associated with the utterance comprises receiving a geographic location of a client device from which the audio signal originated.

12. The system of claim 8, wherein receiving context information associated with the utterance comprises receiving a search history associated with a speaker of the utterance.

13. The system of claim 8, wherein the operations further comprise:
  receiving a set of data derived from the audio signal, the set of data corresponding to one or more time-independent characteristics of the audio signal;
  wherein providing, as input to a neural network, data corresponding to the audio signal and the characteristic data that corresponds to the context information comprises providing, as input to the neural network, data corresponding to the audio signal, the characteristic data that corresponds to the context information, and the set of data derived from the audio signal.

14. The system of claim 13, wherein the set of data corresponding to one or more time-independent characteristics of the audio signal includes one or more of a signal corresponding to an accent of a speaker of the utterance, a signal corresponding to background noise of the audio signal, a signal corresponding to recording channel properties of the audio signal, a signal corresponding to a pitch of the speaker, and a signal corresponding to an age of the speaker.

15. A non-transitory computer-readable medium storing software comprising instructions executable by one or more computers which, upon such execution, cause the one or more computers to perform operations comprising:
  receiving an audio signal encoding a portion of an utterance;
  receiving context information associated with the utterance, wherein the context information is not derived from the audio signal or any other audio signal;
  generating, for input to a neural network of an automatic speech recognition system and based on characteristics of the context information that existed when the context information was received, characteristic data that corresponds to the context information;
  providing, as input to the neural network of the automatic speech recognition system, data corresponding to the audio signal and the characteristic data that corresponds to the context information; and
  generating a transcription for the utterance based on at least an output of the neural network.

16. The computer-readable medium of claim 15,
  wherein providing, as an input to a neural network, data corresponding to the audio signal and the characteristic data that corresponds to the context information comprises providing, as an input to the neural network, a set of acoustic feature vectors derived from the audio signal.

17. The computer-readable medium of claim 15, wherein receiving context information associated with the utterance comprises receiving an internet protocol (IP) address of a client device from which the audio signal originated.

18. The computer-readable medium of claim 15, wherein receiving context information associated with the utterance comprises receiving a geographic location of a client device from which the audio signal originated.

19. The computer-readable medium of claim 15, wherein receiving context information associated with the utterance comprises receiving a search history associated with a speaker of the utterance.

20. The computer-readable medium of claim 15, wherein the operations further comprise:
  receiving a set of data derived from the audio signal, the set of data corresponding to one or more time-independent characteristics of the audio signal;
  wherein providing, as input to a neural network, data corresponding to the audio signal and the characteristic data that corresponds to the context information comprises providing, as input to the neural network, data corresponding to the audio signal, the characteristic data that corresponds to the context information, and the set of data derived from the audio signal.

* * * * *